United States Patent
Gao et al.

(10) Patent No.: US 9,501,104 B2
(45) Date of Patent: Nov. 22, 2016

(54) INVISIBLE SCREW DEVICE AND FASTENING METHOD, AND TERMINAL USING SAME

(71) Applicant: Xiaomi Inc., Beijing (CN)

(72) Inventors: Yuan Gao, Beijing (CN); Fenghui Wu, Beijing (CN); Jianyu Wang, Beijing (CN)

(73) Assignee: Xiaomi Inc., Beijing (CN)

(*) Notice: Subject to any disclaimer, the term of this patent is extended or adjusted under 35 U.S.C. 154(b) by 19 days.

(21) Appl. No.: 14/479,541

(22) Filed: Sep. 8, 2014

(65) Prior Publication Data

US 2015/0085440 A1 Mar. 26, 2015

Related U.S. Application Data

(63) Continuation of application No. PCT/CN2014/077414, filed on May 14, 2014.

(30) Foreign Application Priority Data

Sep. 23, 2013 (CN) .......................... 2013 1 0444573

(51) Int. Cl.
*G06F 1/16* (2006.01)
*H04M 1/02* (2006.01)
*F16B 39/00* (2006.01)
*F16B 37/04* (2006.01)
*F16B 37/06* (2006.01)

(52) U.S. Cl.
CPC ........... *G06F 1/1658* (2013.01); *F16B 37/048* (2013.01); *F16B 37/061* (2013.01); *F16B 39/00* (2013.01); *G06F 1/1656* (2013.01); *H04M 1/0249* (2013.01); *Y10T 29/49948* (2015.01)

(58) Field of Classification Search
CPC ..................... H04M 1/0249; H04M 1/0254
See application file for complete search history.

(56) References Cited

U.S. PATENT DOCUMENTS

| | | | |
|---|---|---|---|
| 5,655,289 A | * | 8/1997 | Wille ...................... B21J 15/26 29/243.53 |
| 6,016,677 A | | 1/2000 | Clark |
| 6,078,495 A | * | 6/2000 | Cipolla ................... G06F 1/203 361/679.46 |

(Continued)

FOREIGN PATENT DOCUMENTS

| CN | 2124834 U | 12/1992 |
|---|---|---|
| CN | 1419055 A | 5/2003 |

(Continued)

OTHER PUBLICATIONS

International Search Report of PCT/CN2014/077414, from the State Intellectual Property Office of China, mailed Jul. 29, 2014.

(Continued)

*Primary Examiner* — Anthony Q Edwards
(74) *Attorney, Agent, or Firm* — Finnegan, Henderson, Farabow, Garrett & Dunner LLP

(57) ABSTRACT

A screw device, for mounting within a housing, configured to fixedly connect a first portion and a second portion of the housing, includes: a driving part fixedly connected within the first portion of the housing; a screw connected with the driving part; a nut fixedly connected within the second portion of the housing and matching the screw; and a chip configured to control the driving part to drive the screw to move relative to the nut, so as to achieve engagement or separation between the screw and the nut.

14 Claims, 3 Drawing Sheets

(56) References Cited

U.S. PATENT DOCUMENTS

| | | | |
|---|---|---|---|
| 6,094,952 | A | 8/2000 | Clark et al. |
| 6,196,037 | B1 | 3/2001 | Urschel et al. |
| 6,212,923 | B1 | 4/2001 | Clark |
| 6,646,555 | B1 * | 11/2003 | Forster ............... H01F 7/06 24/303 |
| 6,893,196 | B2 * | 5/2005 | Wille ............... F16B 19/1072 411/183 |
| 7,719,826 | B1 | 5/2010 | Chang et al. |
| 8,464,412 | B2 | 6/2013 | Huang et al. |
| 8,646,818 | B2 * | 2/2014 | Chen ............... H04M 1/026 292/194 |
| 2005/0079898 | A1 | 4/2005 | Park |
| 2009/0103249 | A1 * | 4/2009 | Strat ............... H05K 5/0008 361/679.01 |
| 2011/0173789 | A1 | 7/2011 | Huang et al. |
| 2011/0228495 | A1 | 9/2011 | Ma et al. |
| 2011/0255218 | A1 | 10/2011 | Pakula et al. |
| 2013/0128417 | A1 * | 5/2013 | Wang ............... H04M 1/0249 361/679.01 |
| 2014/0063716 | A1 * | 3/2014 | Hobson ............... G06F 1/1656 361/679.21 |
| 2014/0092532 | A1 * | 4/2014 | Kole ............... H04M 1/0249 361/679.01 |
| 2014/0253735 | A1 * | 9/2014 | Fox ............... H04M 1/0254 348/164 |
| 2015/0002979 | A1 * | 1/2015 | Liu ............... H01F 7/0252 361/144 |

FOREIGN PATENT DOCUMENTS

| | | |
|---|---|---|
| CN | 1783977 A | 6/2006 |
| CN | 201035636 | 3/2008 |
| CN | 100503174 C | 6/2009 |
| CN | 201387078 Y | 1/2010 |
| CN | 202364503 | 8/2012 |
| CN | 202422305 U | 9/2012 |
| CN | 203070397 | 7/2013 |
| CN | 103495958 | 1/2014 |
| JP | 06-188759 A | 7/1994 |
| JP | 3067930 U | 4/2000 |
| JP | 2002-500305 A | 1/2002 |
| JP | 2005-094763 A | 4/2005 |
| JP | 3151007 | 4/2009 |
| JP | 3151007 | 6/2009 |
| JP | 2010-187313 A | 8/2010 |
| RU | 2295207 C1 | 3/2007 |
| RU | 80647 U1 | 2/2009 |

OTHER PUBLICATIONS

Extended European Search Report of EP 14186009.8, from the European Patent Office, mailed Mar. 5, 2015.

Official Action issued by the Federal Service for Intellectual Property of Russia in Russian Application No. 2015125301/(039366), mailed Jul. 27, 2016 (10 pages including translation).

* cited by examiner

INVISIBLE SCREW DEVICE AND FASTENING METHOD, AND TERMINAL USING SAME

CROSS REFERENCE TO RELATED APPLICATIONS

This application is a continuation of International Application No, PCT/CN2014/077414, filed May 14, 2014, which is based upon and claims priority to Chinese Patent Application No. 201310444573.9, filed Sep. 23, 2013, the entire contents of all of which are incorporated herein by reference.

TECHNICAL FIELD

The present disclosure generally relates to the field of consumer electronic products and, more particularly to an invisible screw device and a fastening method, and a terminal using the invisible screw device and the fastening method.

BACKGROUND

Consumer electronic products include digital cameras, mobile phones, tablet computers, home office equipment, etc. With the popularity of consumer electronic products, users have more and more strict requirements on product appearance. Users often appreciate that surfaces of products are clean, refined, and seamless, and have no extra or useless features. However, a screw, most commonly used as a fastening manner, will usually be seen by users. For example, for conventional smart phones, a screw structure will be visible after a battery cover is disassembled. Such visible screw structure may affect the users willingness to purchase a product.

In order to avoid extra structures from being observed by the users, the extra structures are usually hidden by adopting particular fastening methods. For example, in the design of tablet computers, a front portion of a housing may be connected with a rear portion of the housing by structures such as screws and buckles, and a display module may be bonded to the front portion of the housing by double sided adhesive tapes, so as to hide some unsightly structures, such as screws, etc. But the above connection scheme has the following defects.

Firstly, when being repaired, the display module can only be separated from the housing by hot air baking and sucker adsorption, which causes difficulty in repairing. Secondly, the double sided adhesive tapes can be used only once, and they generally need to be scrapped and replaced after disassembly. Thirdly, the users and non-professionals can freely disassemble the product, which may cause damages.

SUMMARY

According to a first aspect of the present disclosure, there is provided a screw device, for mounting within a housing, configured to fixedly connect a first portion and a second portion of the housing, comprising: a driving part fixedly connected within the first portion of the housing; a screw connected with the driving part; a nut fixedly connected within the second portion of the housing and matching the screw; and a chip configured to control the driving part to drive the screw to move relative to the nut, so as to achieve engagement or separation between the screw and the nut.

According to a second aspect of the present disclosure, there is provided a fastening method, comprising: activating, by a chip, a driving part to act; and driving, by the driving part, a screw to move so as to achieve engagement or separation between the screw and a nut, thereby to achieve connection or separation of a first portion and a second portion of a housing.

According to a third aspect of the present disclosure, there is provided a terminal, comprising: a processor; a memory for storing instructions executable by the processor; a housing for enclosing the processor and the memory; and a screw device mounted within the housing and configured to fixedly connect a first portion and a second portion of the housing, wherein the screw device includes: a driving part fixedly connected within the first portion of the housing; a screw connected with the driving part; a nut fixedly connected within the second portion of the housing and matching the screw; and a chip configured to control the driving part to drive the screw to move relative to the nut, so as to achieve engagement or separation between the screw and the nut.

It should be understood that both the above general description and the following detailed description are only illustrative and explanatory, which do not limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
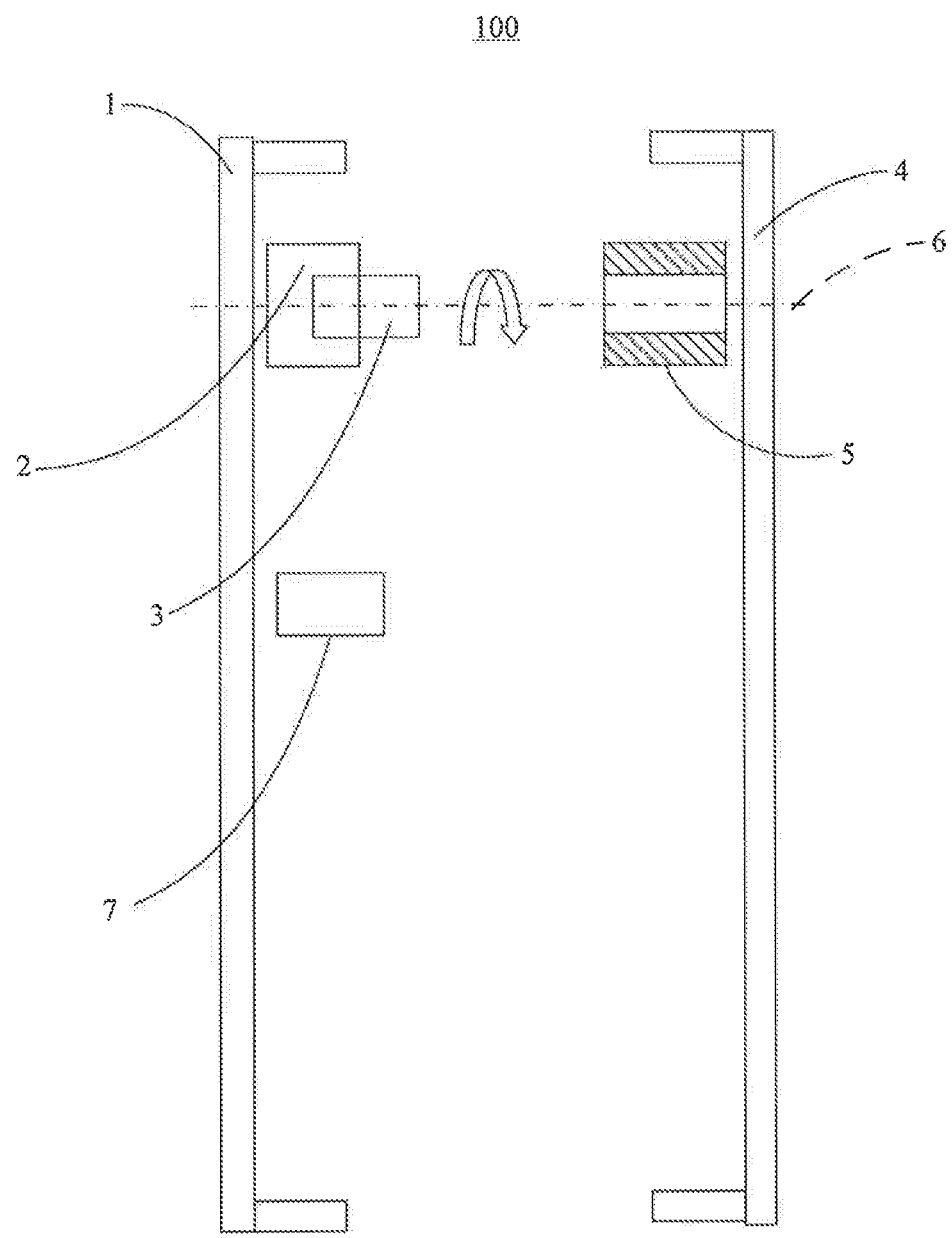
FIG. 1 is a schematic diagram of an invisible screw device, according to an exemplary embodiment.

FIG. 1 is a schematic diagram of an invisible screw device 100, according to an exemplary embodiment. For example, the invisible screw device 100 can be mounted within a housing of a terminal, such as a mobile phone, including a first portion and a second portion. Referring to FIG. 1, the housing of the terminal includes a front portion 1 as the first portion and a rear portion 4 as the second portion, and the invisible screw device 100 is configured to fixedly connect the front portion 1 and the rear portion 4 of the housing.

The invisible screw device 100 includes a driving part 2, a screw 3, a nut 5, and a chip 7. The driving part 2 is fixedly connected within one of the front portion 1 or the rear portion 4 of the housing, and is connected with the screw 3. The nut 5 is fixedly connected within the other one of the front portion 1 or the rear portion 4 of the housing, and matches the screw 3. For illustrative purposes only, FIG. 1 shows that the driving part 2 is fixedly connected within the front portion 1 of the housing, and the nut 5 is fixedly connected within the rear portion 4 of the housing. The chip 7 is configured to control the driving part 2 to drive the screw 3 to move relative to the nut 5, thereby achieving engagement or separation between the screw 3 and nut 5.

In one exemplary embodiment, after the driving part 2 is activated, the screw 3 can take the action of spinning in or out while making a translational motion along an axis 6. The engagement or separation can be achieved after the screw 3 is aligned with the nut 5, which can achieve the connection or separation of the front portion 1 and the rear portion 4 of the housing.

The structure of the invisible screw 3 is used in the device 100 according to the present disclosure, which can achieve internal link and lock while no structure can be observed from the exterior. The device 100 can be repeatedly assembled and disassembled without any part being replaced or scrapped, and the driving part 2 is activated by the chip 7, which can prevent the device 100 from being disassembled by non-professionals, so that use safety may be improved.

In one exemplary embodiment, the driving part 2 is a servo motor. Alternatively, other motors can be used.

In exemplary embodiments, the fixed connection between the driving part 2 and one of the front portion 1 and the rear portion 4 of the housing is bonding, or through the screw 3, or a buckle connection. In the embodiment illustrated in FIG. 1, the fixed connection between the driving part 2 and the front portion 1 of the housing is bonding.

In exemplary embodiments, the fixed connection between the nut 5 and the other one of the front portion 1 and the rear portion 4 of the housing is molding implantation, or hot pressing, or glue connection. In the embodiment illustrated in FIG. 1, the fixed connection between the nut 5 and the rear portion 4 of the housing is molding implantation.

Figure 2:
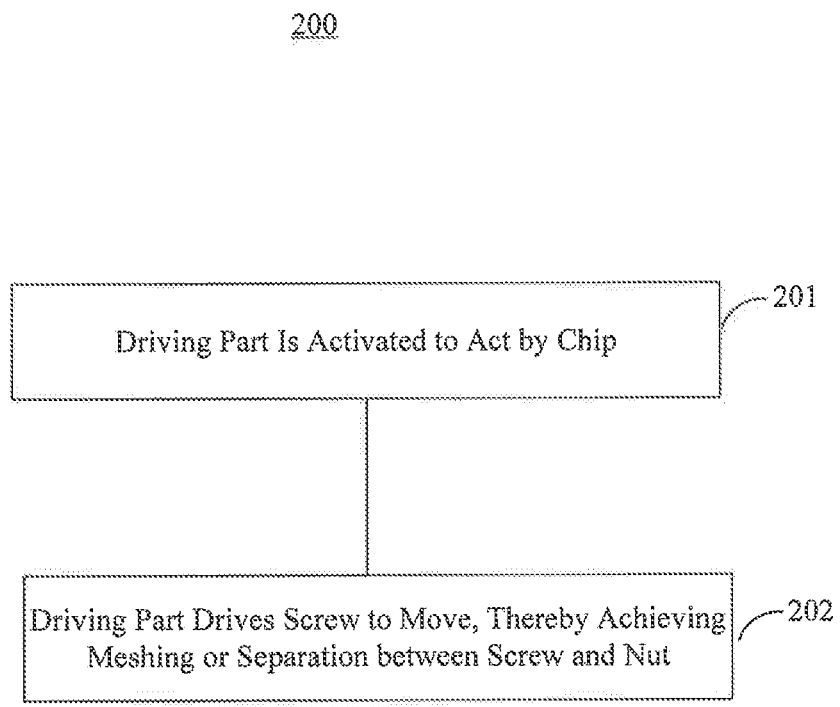
FIG. 2 is a flowchart of a fastening method, according to an exemplary embodiment.

FIG. 2 is a flowchart of a fastening method 200, according to an exemplary embodiment. For example, the fastening method 200 may be implemented with the invisible screw device 100 (FIG. 1). Referring to FIGS. 1 and 2, the fastening method 200 includes the following steps.

In step 201, the driving part 2 is activated to act by the chip 7.

In step 202, the driving part 2 drives the screw 3 to move, thereby achieving engagement or separation between the screw 3 and the nut 5 and, thus, connection or separation of the front portion 1 and the rear portion 4 of the housing.

The invisible screw structure is used in the device 100 and the method 200 according to the present disclosure, which can achieve internal link and lock while no structure can be observed from the exterior. Meanwhile, the device 100 can be repeatedly assembled and disassembled without any part being replaced or scrapped, and the driving part 2 is activated by the chip 7, which can prevent the device from being disassembled by non-professionals, so use safety may be improved.

The method 200 uses the invisible screw structure to achieve internal link and lock while no structure can be observed from the exterior. Meanwhile, the device 100 can be repeatedly assembled and disassembled without any part being replaced or scrapped, and users can use means of confidentiality, such as specifying passwords, to prevent the device 100 from being disassembled by non-professionals. In the illustrated embodiment, the internal link and lock refer to that the fixed connection of the front portion 1 and the rear portion 4 of the housing, which are exterior components, can be achieved by the inner structure of the device 100, which provides sufficient connection strength.

In one exemplary embodiment, step 201 includes inputting a correct password via a product control interface, and then activating the driving part 2 to act by the chip 7. By using the method 200, users can use means of confidentiality, such as specifying passwords, to prevent the device 100 from being disassembled by non-professionals, and use safety may be improved.

Figure 3:
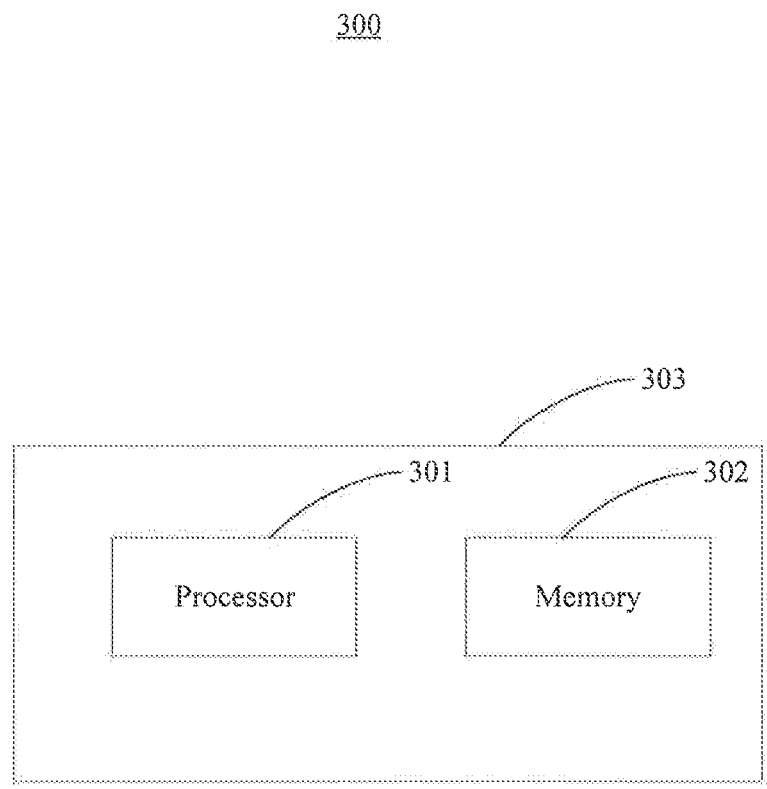
FIG. 3 is a block diagram of a terminal, according to an exemplary embodiment.

FIG. 3 is a block diagram of a terminal 300, according to an exemplary embodiment. For example, the terminal 300 may be a mobile phone, a tablet computer, etc. Referring to FIG. 3, the terminal 300 includes a processor 301, a memory 302 for storing instructions executable by the processor 301, and a housing 303 for enclosing the processor 301 and the memory 302. The terminal 300 further includes an invisible screw device (not shown), such as the invisible screw device 100 (FIG. 1), mounted in the housing 303 to connect first and second portions of the housing 303, similar to the above description in connection with FIG. 1.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A screw device, for mounting within a housing, configured to fixedly connect a first portion and a second portion of the housing, comprising:
    a driving part fixedly connected within the first portion of the housing;
    a screw connected with the driving part;
    a nut fixedly connected within the second portion of the housing and matching the screw; and
    a chip configured to:
        receive a correct password via a product control interface; and
        activate, in response to the correct password, the driving part to drive the screw to move relative to the nut, so as to achieve engagement or separation between the screw and the nut.

2. The device according to claim 1, wherein the driving part is a servo motor.

3. The device according to claim 1, wherein the first portion is a front portion of the housing and the second portion is a rear portion of the housing, the driving part is fixedly connected to the front portion, and the nut is fixedly connected to the rear portion.

4. The device according to claim 1, wherein the fixed connection between the driving part and the first portion of the housing is one of bonding, screw connection, or buckle connection.

5. The device according to claim 1, wherein the fixed connection between the nut and the second portion of the housing is one of molding implantation, hot pressing or glue connection.

6. A fastening method, comprising:
    receiving, by a chip, a correct password via a product control interface;
    activating, by the chip in response to the correct password, a driving part to act; and
    driving, by the driving part, a screw to move so as to achieve engagement or separation between the screw and a nut, thereby to achieve connection or separation of a first portion and a second portion of a housing.

7. The fastening method according to claim 6, wherein the activating of the driving part comprises activating a servo motor.

8. The fastening method according to claim 6, further comprising:
    connecting the driving part and a first portion of the housing by one of bonding, screw connection, or buckle connection.

9. The fastening method according to claim 6, further comprising:
    connecting the nut and a second portion of the housing by one of molding implantation, hot pressing or glue connection.

10. A terminal, comprising:
    a processor;
    a memory for storing instructions executable by the processor;
    a housing for enclosing the processor and the memory; and
    a screw device mounted within the housing and configured to fixedly connect a first portion and a second portion of the housing, wherein the screw device includes:
        a driving part fixedly connected within the first portion of the housing;
        a screw connected with the driving part;
        a nut fixedly connected within the second portion of the housing and matching the screw; and
        a chip configured to:
            receive a correct password via a product control interface; and
            activate, in response to the correct password, the driving part to drive the screw to move relative to the nut, so as to achieve engagement or separation between the screw and the nut.

11. The terminal according to claim 10, wherein the driving part is a servo motor.

12. The terminal according to claim 10, wherein the first portion is a front portion of the housing and the second portion is a rear portion of the housing, the driving part is fixedly connected to the front portion, and the nut is fixedly connected to the rear portion.

13. The terminal according to claim 10, wherein the fixed connection between the driving part and the first portion of the housing is one of bonding, screw connection, or buckle connection.

14. The terminal according to claim 10, wherein the fixed connection between the nut and the second portion of the housing is one of molding implantation, hot pressing or glue connection.

* * * * *